Jan. 21, 1941.                A. CHRISTIANSON ET AL                2,229,047
                              VEHICLE FOOT PLATE ARRANGEMENT
                          Original Filed Nov. 18, 1937    4 Sheets-Sheet 1
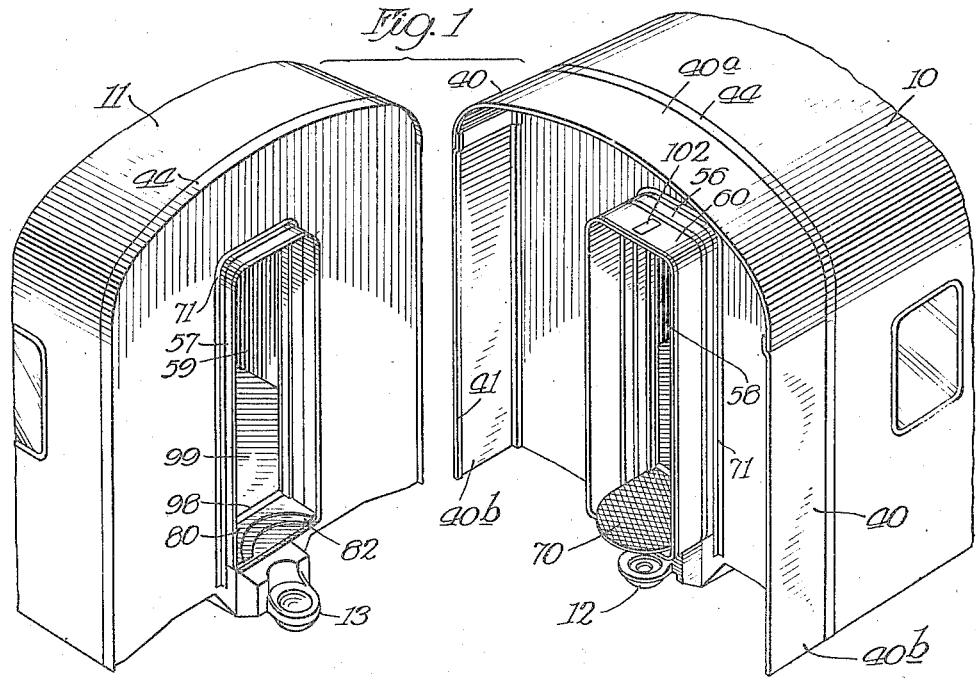
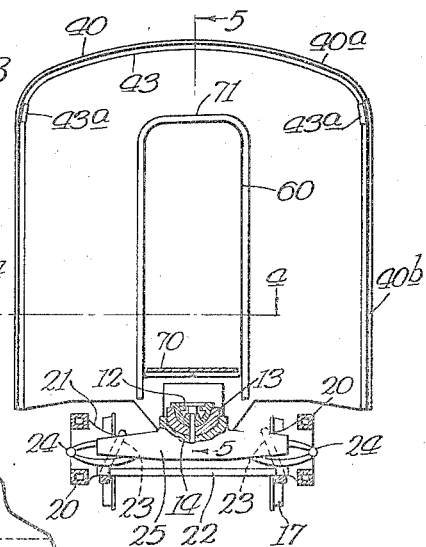
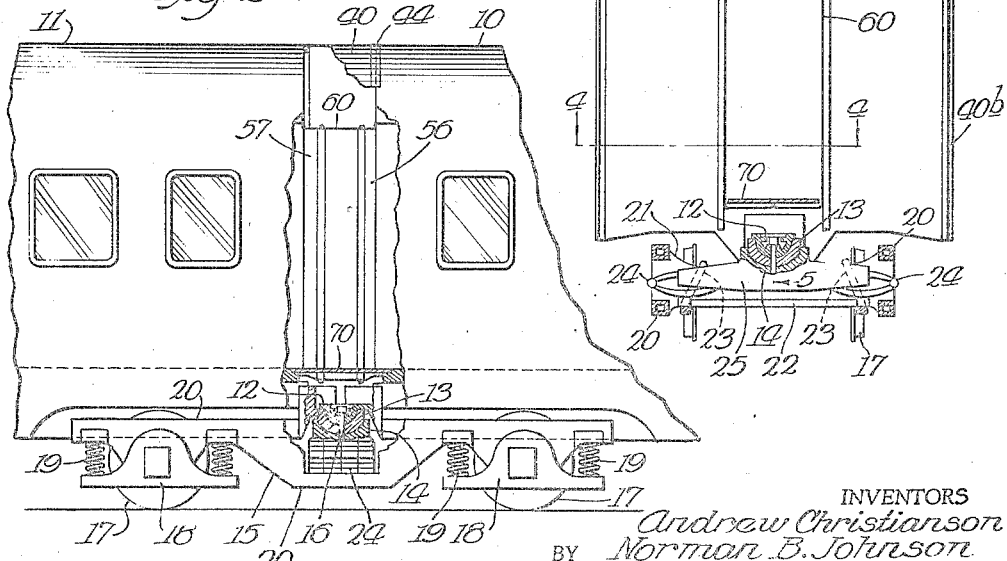
INVENTORS
Andrew Christianson
Norman B. Johnson
BY Oscar H. Ahlberg
ATTORNEY

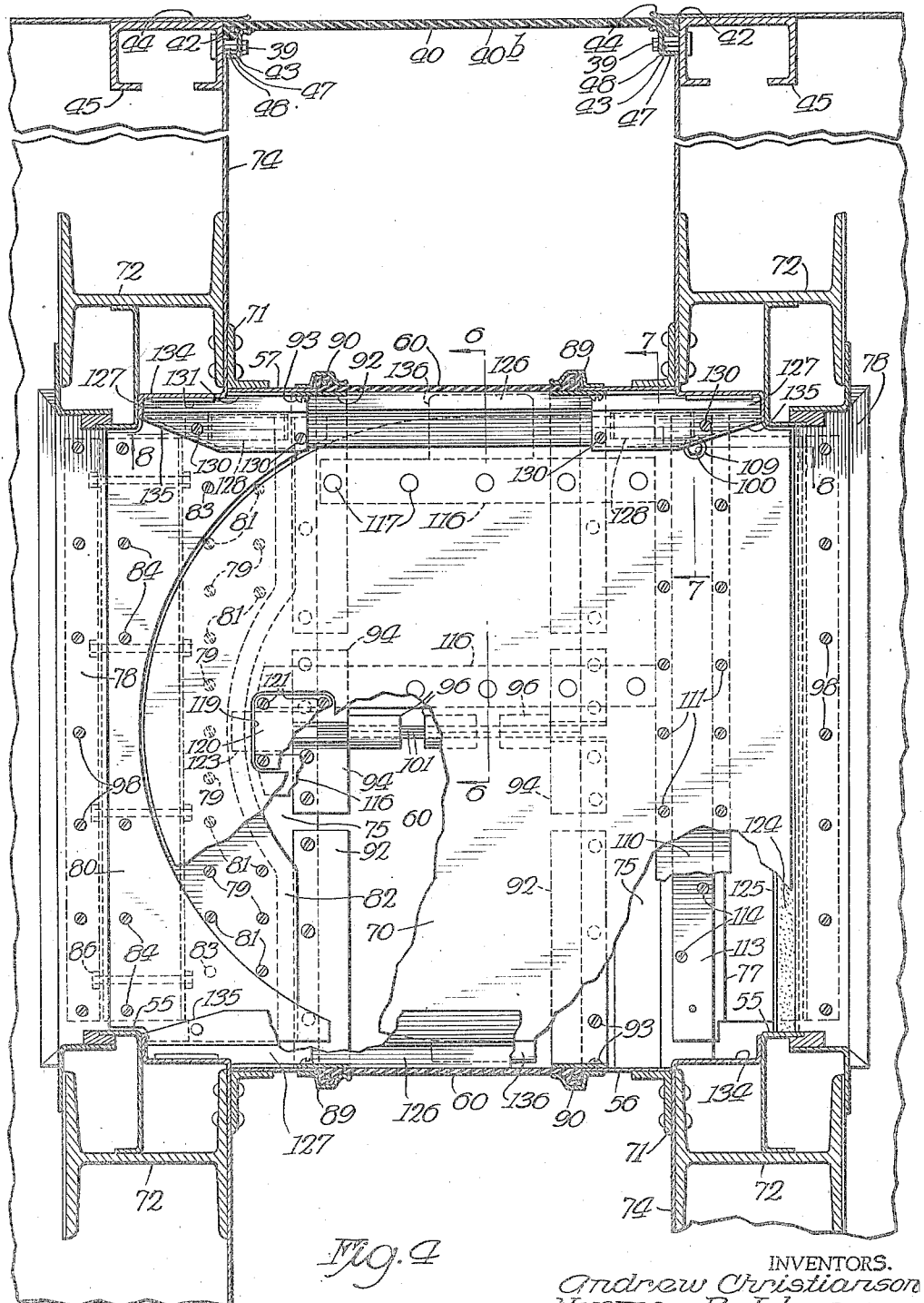

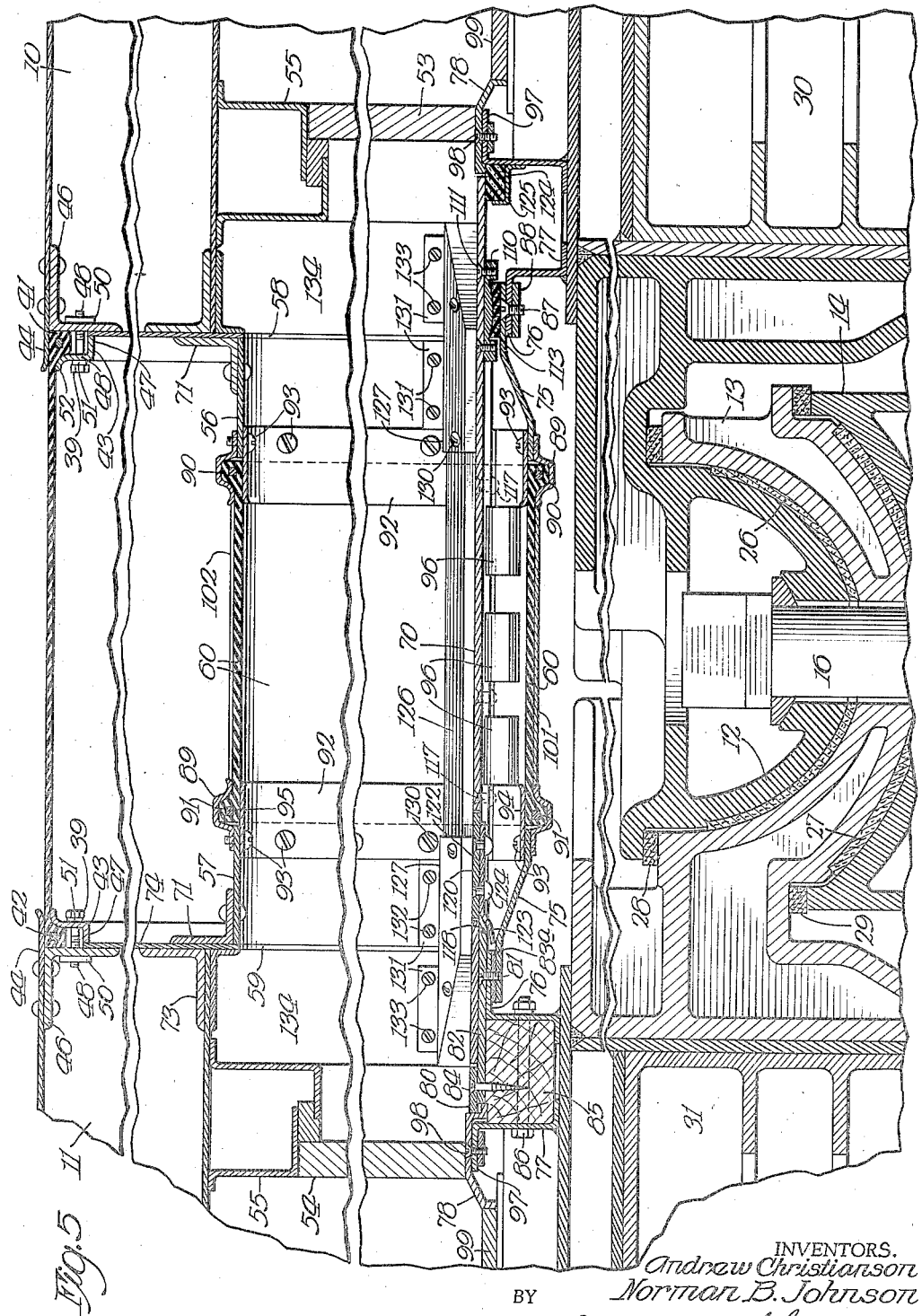

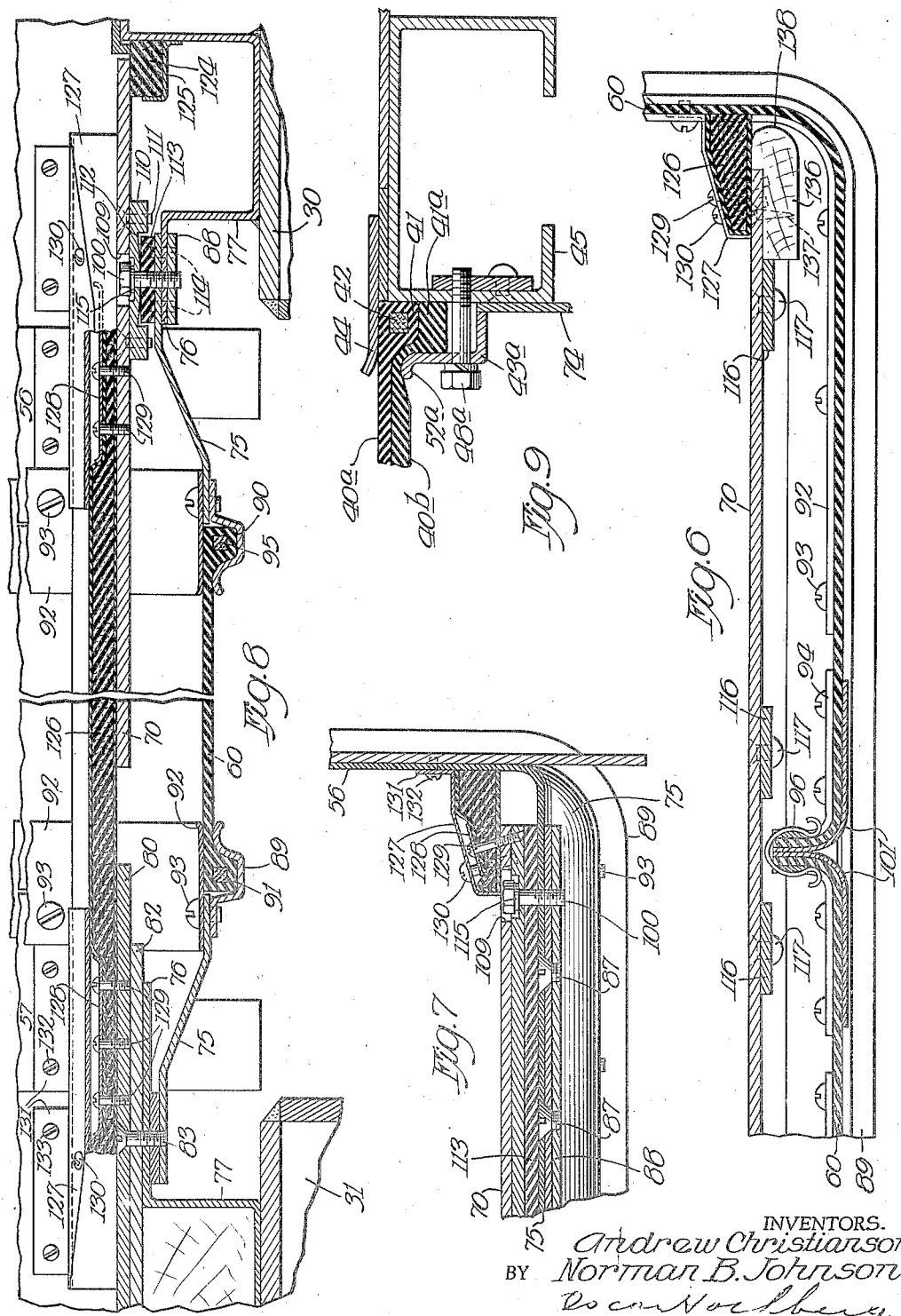

Patented Jan. 21, 1941

2,229,047

UNITED STATES PATENT OFFICE 2,229,047

VEHICLE FOOT PLATE ARRANGEMENT

Andrew Christianson, Hammond, Ind., and Norman B. Johnson, Chicago, Ill., assignors to Pullman-Standard Car Manufacturing Company, Chicago, Ill., a corporation of Delaware Original application November 18, 1937, Serial No. 175,200. Divided and this application June 16, 1938, Serial No. 214,034

14 Claims. (Cl. 105—3)

This application is a division of our copending application, Serial No. 175,200, filed November 18, 1937.

This invention relates to vehicles articulated to provide multi-section units and has for its primary purpose the provision of a continuous, fully enclosed, non-telescoping passageway between units of this type.

The principal object of the invention is the provision of a continuous diaphragm utilizing a semi-floating foot plate affording a fully enclosed passageway between units of an articulated-section vehicle.

The foregoing and other objects are achieved by the arrangement illustrated in the accompanying drawings, in which Fig. 1 is a general perspective view of the adjoining ends of the units of an articulated section vehicle separated to show the passageway diaphragm, foot plate and streamlining diaphragm disconnected and better illustrating their co-operative relation with the respective associated parts of each unit;

Fig. 2 is a side elevational view illustrating two vehicles articulated on a single truck and showing the continuity of the diaphragms between units;

Figure 3 is a cross-sectional view taken at the point of articulation and showing the diaphragm fully enclosing the passageway;

Fig. 4 is a sectional plan view through the passageway and one side of the streamlining diaphragm taken on the line 4—4 of Fig. 3 and showing the details of the foot plate;

Fig. 5 is a longitudinal, vertical, sectional view through the center of articulation taken on the line 5—5 of Fig. 3 and illustrating details of the passageway and streamlining diaphragms and the foot plate and showing the articulated center plates—both body and truck;

Fig. 6 is an enlarged, fragmentary, cross-sectional view through the passageway diaphragm taken on the line 6—6 of Fig. 4 and showing the means for sealing the diaphragm at the bottom and the method of providing a seal between the foot plate and diaphragm at the sides;

Fig. 7 is a fragmentary cross-sectional view through the foot plate and sealing means for the sides thereof, taken on the line 7—7 of Fig. 4 and showing the method of securing the sealing means;

Fig. 8 is a longitudinal, sectional view through the foot plate sealing arrangement taken on the line 8—8 of Fig. 4 and further illustrating its method of attachment; and Fig. 9 is a cross-sectional view through the streamlining diaphragm connection at the overlapping zone between the top or roof section and a vertical side leg portion.

In the drawings, 10 and 11 represent male and female units, respectively, of an articulated section vehicle, having body center plates 12 and 13 nesting respectively one within the other and supporting the adjoining ends of the two units on a single truck 15, as best shown in Fig. 2, by means of a truck center plate 14 into which the nested body center plates 12 and 13 are seated and secured by a locking king pin 16. The truck 15 comprises wheels and axles 17 having journal boxes 18 supporting a truck frame 20 by means of springs 19. The truck frame 20 includes transom members 21 from which spring plank 22 is swingingly suspended by means of swing hangers 23. Bolster springs 24 are seated upon the spring plank and resiliently support the swing bolster 25 with which the truck center plate 14 is integrally formed or, if desired, to which it may separately be attached. Body center plates 12 and 13, as best shown in Fig. 5, are provided with separate bearing faces 26 and 27 interposed between their respective wearing surfaces and at the truck center plate 14. The bearing surfaces 26 and 27 are protected from the entrance of dirt and moisture by means of felt rings 28 and 29 disposed in sealing relation at the periphery of the respective joints. The center plates 12 and 13 are suitably secured to the respective underframes 30 and 31 in any desired manner and designed to transmit to the longitudinal sills thereof the rotative forces set up as a result of eccentric loading inherent in an articulated connection in addition to the usual buff and draft forces.

As shown, the vehicles are of general streamline form, and to preserve this smooth contour between units at the articulation, a flexible streamlining diaphragm 40 is provided which extends the full height of the respective sides and across the width of the smoothly curved roof. The diaphragm 40 is of rubber stretched taut between the vehicle units at their perimeter—providing a continuous, smooth, unbroken surface throughout the length of an articulated vehicle, thereby greatly enhancing the esthetic qualities of the vehicle and affording the ultimate in streamlining between units of this type. The diaphragm itself comprises a flat sheet of rubber 40 of a width which, when applied, will be normally taut, but in which the full elasticity of the rubber is available to afford the stretch necessary as the vehicle units angle with respect to one another in passing about a curve in the track, at which time the diaphragm is placed under tension on one side and extended beyond its normal dimension, but on the opposite side becomes slack and collapses as the units approach each other on that side. The rubber diaphragm 40 is provided with integral enlargements 41 at its opposite edges, affording means of attachment to the respective vehicle units. The enlargements 41 each have a center core 42 of flexible material adapted to reinforce the enlargements and insure the stability of the connections, but which allows sufficient flexing of the rubber to permit ready application of the diaphragm to an irregular contour or for handling purposes. The method of securing the diaphragm 40 to the respective units 10 and 11 maintains a smooth outward appearance and provides a connection which prevents the concentration of stresses in the rubber at localized points and avoids abrasion and tearing of the rubber. The connections to the adjoining units are made without penetrating the rubber and comprise clamping members 43 adapted to engage the enlargements 41 securely to bind the diaphragm 40 between the two units 10 and 11 in uniformly taut relation. The enlargements 41 are turned inwardly and are engaged by the clamps 43 on the inner side of the diaphragm 40 whereby the streamline outer surface is preserved. The streamlining diaphragm is secured in place from the inner or passageway side, and for this purpose and to provide an abutment against which the enlargements 41 might be clamped, an overhanging, flat plate member 44 is placed about the periphery of the ends of the respective adjoining vehicle units and secured to the corner posts 45 at the sides and to the end carline members 46 at the roof by means of rivets, as shown, or by any other suitable fastening means.

The clamps 43 are in the form of angle members, one flange 47 of which is adapted to bear edgewise against portions of the respective end walls reinforced by the framing members 45 and 46 and adapted to fulcrum about this edge-bearing as the nuts 39 on stud bolts 48, passing through the flange 49, are tightened to draw that flange against the enlargement 41 to clamp the streamlining diaphragm against the abutment afforded by the overhanging plates 44, thereby securely to hold the diaphragm in place against the tension exerted thereon as the vehicle units pivot with respect to each other. The bolts 48 are threaded into the framing members 45 and 46 which are provided with small metal plates 50 welded thereto and spaced at intervals coincident with the spacing of bolts 48 and affording additional thread area for the bolts to resist the stresses induced by the diaphragm 40 under tension. Lockwashers 51 insure permanent retention of the nuts 39 at their original adjustment. The flange 49 of the clamp 43 at its edge where it engages the enlargement 41 of the diaphragm 40 is curved, as at 52, to avoid abrasion of the rubber, and the exposed edge of the overhanging abutment plate 44 likewise is curved for this same purpose, whereby the rubber is free to stretch or flex in response to movement of the vehicles without undue wear or strain on this connection.

The diaphragm, as shown, preferably is formed in three sections—the top, or roof section, 40a and the respective side wall portions 40b, as best shown in Fig. 1. The top section 40a is disposed in overlapping weathershedding relation to the respective side wall portions 40b, and, as best shown in Fig. 9, the beads or enlargements 41 and 41a of the respective sections are disposed in overlapping interlocking relation between the separate clamp members 43a used at these points and the overhanging shoulder providing flange 44. It will be noted that the beads or enlargements 41a on the side sections of the diaphragm are of different cross-sectional contour in the area of the overlap than in the remainder of the diaphragm. The bead 41 for the roof section of the diaphragm is of constant cross-section, but that on the side portions is of less thickness at the overlap and of greater length, and the center core 42 is eliminated; and the diaphragm, where it connects with the bead, is shaped to the curve of the bead 41 on the roof section 40a so that the bead and body portion of the side diaphragm 40b closely engages that of the diaphragm top.

The side diaphragm, where it joins with the narrowed bead 41a, is of thinner section, so that the clamp 43a for the overlap is not only in interlocking relation with the side diaphragm, with which it directly engages, but, through that diaphragm, is in overlapping, interlocking relation with the top diaphragm and the curved end 52a of the clamp 43a, while it engages the side diaphragm, overlaps the plane of the bead 41 and the core 42 of the diaphragm top, whereby either diaphragm is prevented from slipping past the other and becoming disconnected under tension. The clamps 43a are individual members coextensive with the overlapping zone of the diaphragms and are secured by cap screws 48a and function exactly like the clamp members 43. It will be seen that the connections 43 and 43a afford means for easily installing the diaphragm 40 under the slight initial tension necessary to maintain the desired tautness.

The adjoining vehicles 10 and 11 are provided with a communicating passageway affording a complete enclosure continuous between vehicles. The passageway extends between the respective end doors 53 and 54 hinged in the door frames 55. The vehicles 10 and 11 are, in usual practice, air conditioned, and the end doors separate the individual vehicle units from the passageway effectively to prevent the influx of relatively warm air through the relatively uninsulated passageway. The passageway comprises a foot plate 70 providing an uninterrupted walkway between the end doors, and a diaphragm 60 extending beneath and completely encircling the foot plate to provide a fully enclosed weatherproof passage from one vehicle to the other. The diaphragm 60 extends between and is secured to metallic extension structures 56 and 57 disposed about the respective passageway openings 58 and 59. The extensions 56 and 57 are substantially alike and comprise each a plate member extending continuously about the respective passageway openings and secured at the top and sides to an angle member 71 to the contour of the openings and which is secured, through the end wall sheathing 74, to the spaced end posts 72 and end plate 73, as best shown in Figs. 4 and 5. The horizontal bottom portion 75 of the respective extensions 56 and 57 is separate for construction purposes but is welded to the vertical side legs with which the horizontal top portion is integral, so that, in effect and for all practical purposes, the extensions are in one piece and continuous about the respective passageway openings. The bottom portion 70 75 slopes upwardly and is removably secured to the outwardly extending flange 76 of a flanged channel pressing 77 supporting the end door threshold 78 on each vehicle and the foot plate 70. The member 75 on the vehicle unit 11 is secured beneath the flange 76, while that on the unit 10 is secured above the flange for a purpose which will hereinafter appear.

The member 75 on the unit 11 is secured by a number of screws 79, 81 and 83. The screws 79 penetrate only the flange 76 and the member 75 with the intervening filler member 83 which is secured to the member 75 by welding and serves to thicken the portion thereof engaged by the screws and provides greater thread area therefor. The screws 81, in addition to taking the flange 76, also secure a non-metallic plate 82 which provides a supporting surface for the free edge of the foot plate 70. Screws 83 secure the fixed portion 80 of the passageway foot plate and penetrate the plate 82 and flange 76 and, like screws 79 and 81, are threaded into the thickened portions of the member 75. The screws of different lengths permit ready assembling of the various parts affected during construction, and all have countersunk heads, as shown. The member 75 on the unit 10 rests on top of the flange 76 and is secured by screws 87 threaded into the flange which is thickened by a plate 88 secured on the underside thereof by welding to provide the additional thread area necessary properly to secure the screws.

A separate, formed member 89 is disposed about the edge periphery of the respective extensions 56 and 57, and, while in actual practice it is in several pieces, the adjoining members are butt-welded together to form a unitary member extending continuously about the passageway extension plates and is integrally secured thereto by welding so that each of the extension assemblies, as applied, is substantially a one-piece unit. The member 89 is secured about the outer surface of the respective extension plates and is shaped to provide a groove 90 opening inwardly adapted to receive the respective enlargements 91 at opposite edges of the diaphragm 60 in close engagement and which are securely held in place therein by clamping plates 92 removably secured to the extensions 56 and 57 by screws 93 and overlapping the groove 90. The clamping plates 92 are continuous about the top, sides and portions of the bottom, but, as best shown in Fig. 4, separate pieces 94 are utilized adjacent the point where the ends of the diaphragm 60 are joined for holding the enlargements 91 properly in place. The enlargements 91, like those in the streamlining diaphragm, are reinforced by flexible cores 95, but in the application of the passageway diaphragm, the enlargements are directed outwardly in order that a smooth inner surface may be presented to the passageway free of any obstruction whatsoever.

The diaphragm 60 is inherently elastic, and the enlarged edges are confined in the grooves 90 by the clamping plates 92 and the diaphragm initially stretched taut between adjoining passageway extensions 56 and 57, and relative pivotal movement between the units 10 and 11 is accommodated by the inherent elasticity and flexibility of the diaphragm—one side of the diaphragm being stretched during such movement, while the opposite side is flexed. The diaphragm is in one piece continuous about the passageway and joined at the bottom beneath the foot plate 70. The ends of the diaphragm are turned upwardly beneath the foot plate where they join and are held in sealing relation by clamp members 96 drawing the ends together and by the clamping plates 94. As best shown in Fig. 6, the diaphragm ends, where they join, are reinforced by fabric 101 vulcanized thereto to prevent any possibility of tearing of the rubber. The diaphragm, under tension as described, offers the utmost safety to persons traversing the passageway. At the center of the diaphragm no stretch occurs other than the initial tension applied, but, due to the pivotal relation of the articulated vehicles, considerable twisting action occurs in the rubber at this area, and to strengthen it against this constant wear the diaphragm top, at the center, is reinforced by fabric 102 vulcanized thereto, as best shown in Figs. 1 and 5.

The flanged channel threshold and footplate-supporting pressings 77 are secured to the underframes 30 and 31 by welding and extend between the respective end posts 72. The thresholds 78 are secured to the flanges 97 of the respective members 77 by screws 98 and are adapted to establish continuity between the respective vehicle floors 99 and the foot plates 70 and 80. The fixed foot plate 80 is on the unit 11 and, with the nonmetallic plate 82, extends the full width of the passageway and about the arcuate free edge of the foot plate 70 and to the threshold 78. The edge of the plate 80 adjacent the threshold 78 is secured by woodscrews 84 which also secure that edge of the plate 82 and are threaded into a wooden block 85 secured in the channel of the pressing 77 by bolts 86. The free edge of the foot plate 70 is supported on the unit 11 by the non-metallic plate 82 upon which it moves, while on the unit 10 it is secured to the flange 76 of the pressing 77 by means of cap bolts 100, as best shown in Fig. 8. It is to be noted that the heads of the bolts 100 do not project above the surface of the foot plate, but are disposed entirely thereneath. The bolts do not take the foot plate proper but only pass through a rocker plate 110 secured on the underside of the foot plate 70 by screws 111 having countersunk heads. The foot plate is provided with openings 109 accommodating the heads of the bolts 100. The rocker plate 110 extends the full width of the foot plate and is provided with an inset arcuate rocking surface 112, throughout its full extent, adapted to have bearing on a resilient pad of rubber 113 coextensive with the rocker plate and secured to the flange 76 by countersunk screws 114. The pad of rubber 113 provides a cushion permitting the necessary rocking action of the foot plate during relative movement of associated vehicles without straining or bending the bolts 100. Spring washers 115, under the heads of bolts 100, permit the rocking action of the foot plate without allowing the development of lost motion, whereby quiet operation is assured.

The foot plate is reinforced by plates 116, secured on the underside thereof by rivets 117 countersunk on the upper side, which extend across the unsupported portion of the foot plate between vehicles and serve to stiffen the foot plate in this area. The free edge of the foot plate 70 is positively prevented from rising from its normal supported position on the non-metallic plate 82 under action of the associated vehicles. The edge of the plate 82 extends beyond the supporting flange 76 towards the point of articulation and is cut out at 118 on an arc swung from the center of articulation, and this projecting edge, relatively fixed as it is, affords means positively to prevent upward movement of the foot plate. The movable foot plate is cut out at 119 to provide a rectangular opening for a separate plate 120 which is secured to the portions of the spaced plates 116 underlying the opening at opposite sides of the center thereof by screws 121 having countersunk heads. A plate 122, having an offset projecting lip 123 underlying the projecting edge 113 of the plate 82, is secured to the removable plate 120 by rivets 124 countersunk on the upper side and fits between the two reinforcing plates 116 at the center. The lip 123 is adapted to underlie the plate 82 throughout the full movement of the foot plate and moves about the arc described by the recess 118, since this arc is swung from the same point about which the foot plate rotates.

The foot plate 70 is supported on the unit 10 by the cushion 113 upon which it rocks, as above described, and extends to the threshold 78 without benefit of an intervening fixed plate as on the unit 11. The edge of the plate adjoining the threshold therefore moves vertically with respect thereto as the foot plate rocks upon the cushion 113. To provide a seal at this edge of the foot plate and to accommodate the necessary movement, a strip of sponge rubber 124 is disposed beneath the plate, extending the full width thereof, in position to be engaged by the underside of the foot plate to prevent dirt or the like from falling through the opening between the threshold and foot plate necessary for clearance purposes and is supported from the flanged channel pressing 77 by means of an angle strip 125 coextensive with the rubber and welded to the vertical web of the pressing.

A seal is also provided at each of the side edges of the foot plate between the foot plate and diaphragm. These seals each comprise a pad of sponge rubber 126 extending between housings 127 secured respectively on the fixed foot plate 80 on the unit 11 and on the movable foot plate 70 adapted to bear against the foot plate and the diaphragm 60 at each side and to be stretched or flexed as the vehicles negotiate curves, and effectively to seal the space existing between the foot plate and diaphragm sides. The sponge rubber is secured to the respective foot plates independently of the housing members, as best shown in Figs. 7 and 8. Similar plate members 128, having curved edges to avoid abrasion of the rubber, clamp each of the pads 126 at opposite ends to the fixed and movable foot plates and are secured each by a plurality of screws 129 taking the foot plates. The housings 127 act as guards covering the ends of the sponge rubber sealing members and the clamping devices and are secured to the respective foot plates each by a plurality of screws 130. Upwardly turned flanges 131 are secured by screws 132 and 133, respectively, to the extension members 56 and to the portions 134 of the end sheathing 74 which turns inwardly at the passageway and joins with the door frames 55—thus effectively rigidifying the housings. As best shown in Fig. 4, the housings are sloped at their ends adjacent the respective end doorways, as at 135, to avoid projections immediately at the door openings.

As shown in Figs. 4 and 6, the movable foot plate 70 is provided at each side with a block of wood 136 secured thereto by woodscrews 137 and extending beyond the respective side edges of the foot plate in position to be engaged by the diaphragm sides as the vehicles round a curve. The block 136, while secured beneath the foot plate, is disposed flush with the surface of the plate where it extends therebeyond and acts as a positive support for that portion of the sponge rubber 126. The outer edge of the block is rounded, as at 138, and functions to prevent the rubber of the diaphragm from coming in contact with the sharp edges of the foot plate as curves in the track are negotiated and causes the diaphragm side on the inner side of the curve to flex outwardly rather than inwardly and thus avoids abrasion of the rubber by the raw edges of the foot plate. The woodblock is fixed to and moves with the foot plate 70 and is of such length as properly to support the sponge rubber and prevent inward flexing of the diaphragm, but allows clearance between the vehicles sufficient to permit relative swiveling movement.

It will be noted that the foot plate 70 is fixed to the unit 10 having the male fixtures 12, and when the vehicles are separated the diaphragms 40 and 60 both remain attached to this unit, but it is, of course, necessary to remove the foot plate entirely before the passageway diaphragm is removed.

The diaphragms of this invention are disposed initially under tension between associated vehicles and by this fact afford a streamlining diaphragm of the highest efficiency and to the exact cross-sectional contour of the vehicles and a passageway diaphgram offering the utmost protection to anyone traversing it. The diaphragms are effectively secured without the necessity of penetrating the diaphragm material. The passageway foot plate arrangement consists of a semi-floating foot plate flexibly secured to one unit for vertical rocking action about a transverse axis and supported on an adjacent unit and having means adequately to seal the plate about all of its edges.

What is claimed is:

1. In an articulated unit involving a plurality of vehicles, a passageway between the vehicles, a footplate in the passageway secured to one of said vehicles, nonmetallic means on the other vehicle supporting the free end of said footplate, rocker means supporting the footplate on said first vehicle, and resilient means sealing the footplate with respect to said first vehicle.

2. In an articulated unit involving a plurality of vehicles, a passageway between the vehicles, a footplate in the passageway, nonmetallic means supporting one end of the footplate on one of said vehicles, nonmetallic means on the other vehicle in non-supporting engagement with the opposite and of the footplate, rocker means supporting said footplate intermediate its ends on non-metallic means on said last named vehicle whereby the footplate is adapted to have relative rocking movement with respect thereto, and means securing the footplate to said last-named vehicle for pivotal movement therewith.

3. In an articulated unit involving a plurality of vehicles having a common support for relative pivotal movement, a footplate between the vehicles, nonmetallic means on one of the vehicles supporting one end of said footplate for pivotal relation thereto, resilient means on the other vehicle supporting the footplate intermediate its ends, rocker means on the footplate engaging said resilient means for relative rocking movement of the footplate with respect thereto, means on said other vehicle of greater resiliency than said resilient means providing a cushioned seal between that vehicle and the other end of said footplate, and means securing the footplate to said last named vehicle for pivotal movement therewith.

4. in an articulated unit involving a plurality of vehicles having a common support for relative pivotal movement, a footplate between the vehicles having one end thereof supported on one of the vehicles in pivotal relation thereto, resilient means on the other vehicle supporting the footplate, rocker means on the footplate intermediate its ends for cooperation with said resilient means, means on said other vehicle of greater resiliency than said resilient means providing a cushioned seal between that vehicle and the other end of the footplate, and means securing the footplate to said last named vehicle for pivotal movement therewith.

5. In an articulated unit involving a plurality of vehicles having a common support for relative pivotal movement, a footplate between the vehicles having one end thereof supported on one of the vehicles in pivotal relation thereto, resilient means on the other vehicle supporting the footplate, rocker means on the footplate for cooperation with said resilient means, and means securing the footplate to said last named vehicle for pivotal movement therewith.

6. In an articulated unit involving a plurality of vehicles having a common support for relative pivotal movement, a footplate between the vehicles, means on one of the vehicles supporting one end of the footplate in pivotal relation thereto, means disposed on the underside of the footplate underlying said supporting means, said means being removably mounted with respect to the footplate, means flexibly supporting the footplate on the other vehicle, and means securing said footplate on the last named vehicle for pivotal movement therewith.

7. In an articulated unit involving a plurality of vehicles having a common support for relative pivotal movement, a passageway between the vehicles, a footplate in the passageway having an arcuate recess and fixedly secured to one of said vehicles, a footplate in the passageway having an arcuate free edge supported in said arcuate recess for relative pivotal movement, and means for flexibly securing said last named footplate to the other vehicle for movement relative thereto and for pivotal movement therewith, said relative movement occurring in a plane perpendicular to the plane of said pivotal movement whereby the footplate has pivotal movement in planes perpendicular to each other.

8. In an articulated unit involving a plurality of vehicles having a common support for relative pivotal movement, a passageway between the vehicles, a footplate in the passageway having an arcuate recess and fixedly secured to one of the vehicles, a nonmetallic plate underlying said footplate and recess, a footplate in the passageway having an arcuate free edge supported in said recess on said nonmetallic plate for relative pivotal movement, and means flexibly securing said last named footplate to the other vehicle for movement relative thereto and for pivotal movement therewith, said relative movement occurring in a plane perpendicular to the plane of said pivotal movement whereby the footplate has pivotal movement in planes perpendicular to each other.

9. In an articulated unit involving a plurality of vehicles having a common support for relative pivotal movement, a passageway between the vehicles, thresholds on the respective vehicles defining the extent of said passageway, a footplate in the passageway having an arcuate recess and fixedly secured to one of the vehicles in abutting relation to the threshold, a footplate in the passageway having an arcuate free edge supported in said recess for relative pivotal movement, and means flexibly securing said last named footplate intermediate its ends to the other vehicle for movement relative thereto and for pivotal movement therewith, said relative movement occurring in a plane perpendicular to the plane of said pivotal movement and said last named footplate extending to the threshold on that vehicle.

10. In an articulated unit involving a plurality of vehicles having a common support for relative pivotal movement, a passageway between the vehicles, thresholds on the respective vehicles defining the extent of said passageway, a footplate in the passageway having an arcuate recess and fixedly secured to one of the vehicles in abutting relation to the threshold, a nonmetallic plate underlying said footplate and recess, a footplate in the passageway having an arcuate free edge supported in said recess on said nonmetallic plate for relative pivotal movement, and means flexibly securing said last named footplate intermediate its ends to the other vehicle for pivotal movement therewith in substantially a horizontal plane and for pivotal movement in a plane perpendicularly to said horizontal plane and independently of said first-named pivotal movement, said last named footplate extending to the threshold on that vehicle, said threshold having nonmetallic sealing means disposed in association with said last-named footplate.

11. In an articulated unit involving a plurality of vehicles having a common support for relative pivotal movement, a footplate between the vehicles, means on one of the vehicles supporting one end of the footplate in pivotal relation thereto, means disposed on the underside of the footplate underlying said supporting means, said means being removable from the upper side of the footplate, means flexibly supporting the footplate on the other vehicle, and means securing said footplate on the last-named vehicle for pivotal movement therewith.

12. In an articulated unit involving a plurality of vehicles, a passageway between the vehicles, a footplate in the passageway secured to one of said vehicles, means on the other vehicle supporting the free end of said footplate, and rocker means at the point of securement of and supporting the footplate on said first vehicle.

13. In an articulated unit involving a plurality of vehicles, a passageway between the vehicles, a footplate in the passageway, means supporting one end of the footplate on one of the vehicles, resilient means on the other vehicle, rocker means supporting the footplate on said resilient means, and means securing the footplate to said last-named vehicle in the area of said resilient means and said rocker means.

14. In an articulated unit involving a plurality of vehicles having a common support for relative pivotal movement, a footplate between the vehicles, means on one of the vehicles supporting one end of the footplate in pivotal relation thereto, means disposed on the underside of the footplate underlying said supporting means, said means being removable from the upper side of the footplate, and means supporting the footplate on the other vehicle.

ANDREW CHRISTIANSON.
NORMAN B. JOHNSON.